United States Patent

[11] 3,533,485

[72] Inventors Frank G. Buffum, Jr.,
China Lake, Calif.;
Richard O. Slates, deceased, late
of China Lake, Calif., by Barbara J. Slates,
administratrix, China Lake, Calif.;
Edward W. Price and Homer B.
Mathes, China Lake, Calif.
[21] Appl. No. 800,365
[22] Filed Feb. 12, 1969
[45] Patented Oct. 13, 1970
[73] Assignee The United States of America as
represented by the Secretary of the Navy

[54] METHOD AND APPARATUS FOR DETERMINING THE ACOUSTICS OF ROCKET MOTOR CHAMBERS
8 Claims, 8 Drawing Figs.
[52] U.S. Cl. .................................................. 181/0.5,
73/117.1
[51] Int. Cl. ...................................................... G01h 3/12
[50] Field of Search .......................................... 181/.5(B);
340/15.5(synth); 73/116, 117.1; 35/13

[56] References Cited
UNITED STATES PATENTS
| | | | |
|---|---|---|---|
| 2,862,200 | 11/1958 | Shepherd et al. .............. | 181/.5 |
| 2,930,226 | 3/1960 | Spalding ....................... | 35/13 |
| 3,246,290 | 4/1966 | McClure ....................... | 340/15.5 |

*Primary Examiner*—Rodney D. Bennett, Jr.
*Assistant Examiner*—Daniel C. Kaufman
*Attorneys*—Edgar J. Brower, Roy Miller and Gerald F. Baker ABSTRACT: A method and apparatus is provided for predetermining the attenuation coefficient of full scale loaded rocket engines through nondestructive investigation of a scale model. In one system, the model rocket chamber is supplied with cold air entering the forward end through a porous, sintered plate and a portion of the entering air is modulated by a rotary valve.

In no-flow testing, a speaker is attached at the forward end of the motor and the rocket nozzle is replaced with a tube lined with an acoustically absorbent material such as fur or the like. In each case the acoustic response of the motor chamber is recorded and the chamber attenuation coefficient, $\alpha t (ln P_0 e^{-\alpha t})$ computed from measurements of the half-power bandwidth of the response curve.

3,533,485

METHOD AND APPARATUS FOR DETERMINING THE ACOUSTICS OF ROCKET MOTOR CHAMBERS

GOVERNMENT INTEREST

The invention described herein may be manufactured and used by or for the Government of the United States of America for governmental purposes without the payment of any royalties thereon or therefor.

BACKGROUND OF THE INVENTION

In the design and development of rocket engines no single factor has been more vital or more frustrating than the problems of unstable combustion. Particularly frustrating has been the inability to predict the especially destructive form of instability called "acoustic instability" characterized by high frequency variations in the pressure of the combustion chamber.

Efforts to reduce or eliminate acoustic instability in rocket engine design has been largely based upon trial and error with full scale firings. Because of a relatively high rate of error, such efforts have been costly and time consuming and intensive research by many investigators has been directed toward the provision of means for predicting the stability of full scale rocket engines; preferably by nondestructive testing of small scale models.

It is the primary purpose of this invention to provide apparatus, and methods using the apparatus for testing models of proposed or existing rocket engines to predict stability boundaries dependent upon acoustic gain and loss mechanisms associated with the rocket chamber.

SONIC FLOW METHOD AND APPARATUS

Figure 1:
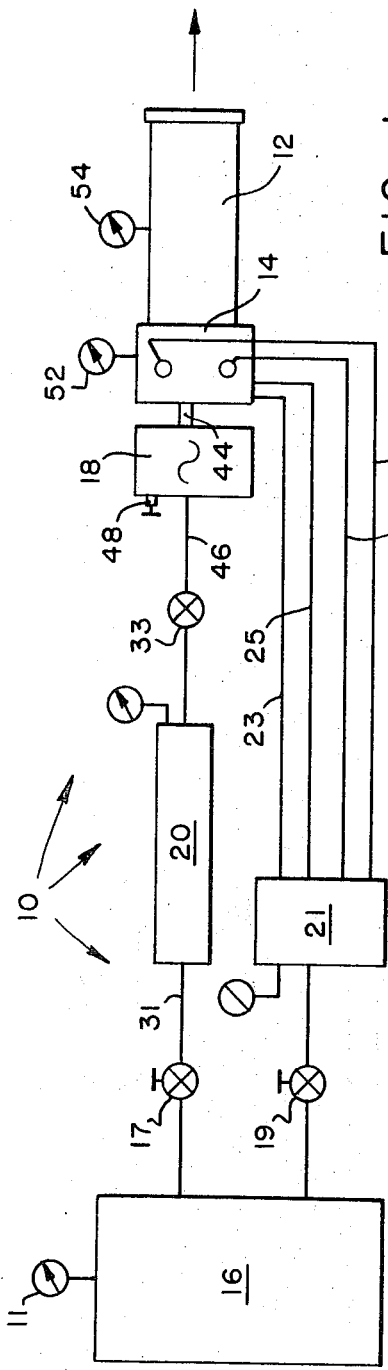
FIG. 1 is a simplified block diagram of a sonic flow system to the invention.

The acoustic test method and system according to the FIG. 1 embodiment of the invention enables resonance-type tests to be made of model rocket chambers while maintaining a sonic nozzle throat condition. It has been reliably shown that such a nozzle boundary condition properly simulates the actual motor acoustic conditions.

To date, this system has been used for a variety of tests. Scale model motors have been tested and the effects of various motor internal geometry changes noted thus indicating which geometry is potentially the most stable. Tests have been run on various nozzle configurations to determine the adequacy of present theoretical treatments. Other tests have been run to determine the effects of various nozzle throat boundary conditions. This type of system determines the acoustic attenuation constant, $\alpha$, for various model motor chambers having through flow and a sonic nozzle throat condition by determining the half-power bandwidth of the chamber response curve. These tests have been termed "Steady-State Resonance Tests with Flow."

Since such tests can be run easily, cheaply, and quickly compared with actual hot motor instrumentation and firings, the present system should prove very advantageous.

The sonic flow test system 10 is shown in FIG. 1 fitted with a rocket model chamber 12. A steady air supply capable of maintaining sonic flow in the nozzle of the model and a variable frequency oscillating air supply to drive the chamber are provided through a prechamber device 14, and instrumentation is connected to detect and record the resulting rocket chamber behavior.

The main air flow is regulated by valve 19 from a storage tank 16 through manifold 21 to the motor prechamber 14 through four lengths 23, 25, 27, 29 of high pressure hose. The hose is acoustically isolated from the prechamber by a porous plate or ring 26 (see FIG. 2) spanning the prechamber inlets 24. A smaller volume of air for the modulated air supply is fed through pressure regulator 17 and tubing 31 to a surge tank 20 through a solenoid valve 33 and hose 46 to the rotary valve 18, and through conduit 44 into the prechamber 32 in device 14. Exhaust for valve 18 is provided through port 48.

The numerals 11, 52 and 54 designate pressure gauges on the supply tank, the prechamber device and the rocket model respectively.

Figure 2:
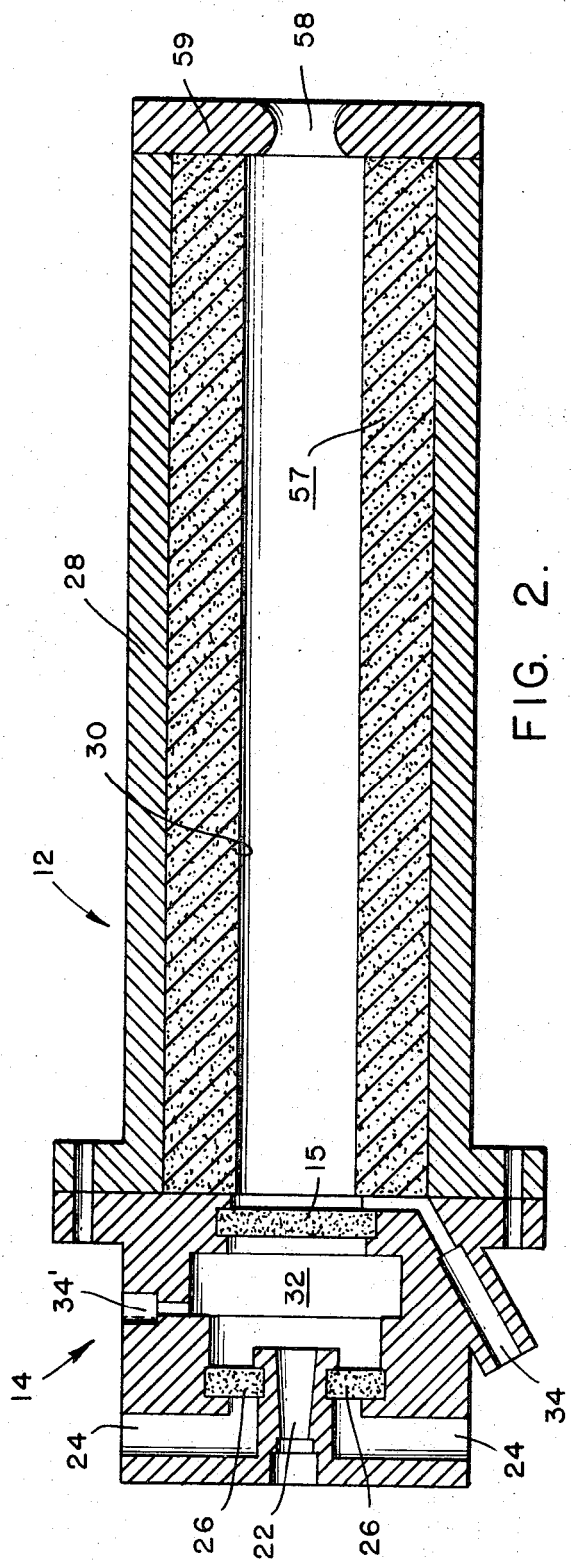
FIG. 2 is a detailed longitudinal cross-sectional view of the prechamber and the attached rocket model in accordance with FIG. 1.

The model rocket assembly 12 is fitted to the prechamber device 14 as shown in FIG. 2. A model propellant grain 57 is shown in place in model tube 28 and a nozzle plate 59 is attached having the desired nozzle opening 58.

Prechamber 32 is separated from the test chamber 30 of model grain 28 by a high impedance barrier in the form of a porous plate 15. This high impedance barrier is introduced so that the model chamber 30 can be driven by the large amplitude oscillations in the prechamber 32 without any appreciable feedback or reverse coupling from the chamber 30. Flow through the plate 15 is maintained by pressure in the prechamber 32 which pressure is connected to the high pressure air storage system. This pressure is controlled by regulating valves 17, 19 shown in the schematic diagram of the air-feed system in FIG. 1.

There are two microphone ports 34, 34' in the prechamber housing 14. One (34') is used to monitor the acoustic pressure oscillations in the prechamber cavity 32; the other 34 to detect the acoustic oscillations at the head of the model chamber 30. The oscillating flow from the rotating valve 18 enters the prechamber cavity 32 directly through axial port 22. Four side ports 24 located concentrically around the head of prechamber housing 14 are used to provide the main air supply. The steady air flow enters prechamber 37 by passing through annular disk 26 of porous, sintered stainless steel. This is done to acoustically isolate prechamber 32 from the main air-feed system and thereby minimize acoustic losses and supply line resonances.

The inside dimensions of prechamber 32 form a cylindrical cavity approximately 2 inches in diameter and 2 inches in length. The natural frequency of this cavity is about 3,000 c.p.s., several times any frequencies of interest during testing. Disk members 15 and 26 formed of porous steel plate material are used in the prechamber assembly for acoustical isolation, one between the manifold and the prechamber and another between the prechamber and the chamber. The basic rule for choosing the porosity of these plates is to keep a 2 to 1 pressure ratio between the prechamber and the chamber during any tests. Table 1 gives the porous plate porosities used with various nozzle sizes for these two locations. The prechamber 32 is used to unite the steady and pulsating supply flows.

Figure 3:
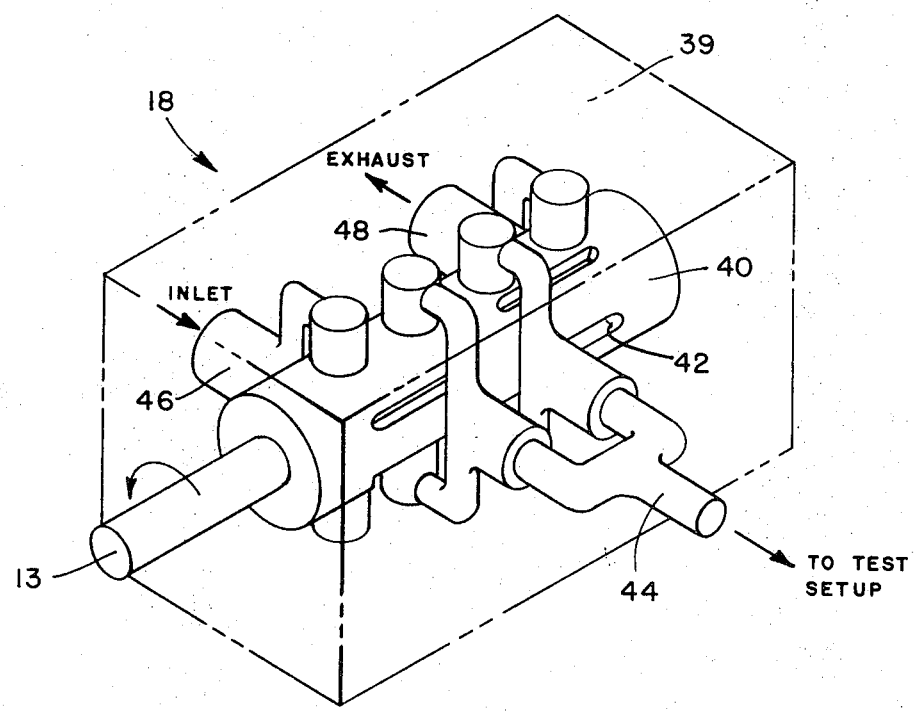
FIG. 3 is a perspective view of the rotary valve.

The rotary valve 18 is used to produce a sinusoidal pressure forcing function in the prechamber. The valve 18 (see FIG. 3) comprises a rotating cylinder 40 having a balanced slot arrangement and adapted to be rotated in housing 39 by shaft 13 preferably by an air motor (not shown). The valve 18 is designed to provide 6 cycles of alternate inflow through inlet 46 and exhaust (to the atmosphere) through exhaust port 48 per cycle of valve rotation. The output wave form depends on the outlet and inlet pressure ratios and the orientation and shape of the rotor slots 42. Using this system, the prechamber driving frequency can be varied across a wide frequency range with a nearly sinusoidal wave form. The valve output is introduced at one end of the prechamber from pipe 44 through opening 22 (FIG. 2).

The ratio between nozzle throat area and the area of the grain port is here designated as the J valve and table 2 provides a list of J valves obtainable with the hardware made available in tests using 1 foot long grains and abrupt entry nozzles.

TABLE 1.—POROUS PLATE POROSITIES FOR VARIOUS NOZZLE-SIZES

| Nozzle size | Manifold-prechamber, $\mu$ | Prechamber-chamber, $\mu$ |
|---|---|---|
| Less than 3/8 in | 20 | 20 |
| 3/8 in. to 3/4 in | 20–40 | 40 |
| 3/4 in. to 1 1/4 in | 40–70 | 60 |

NOTE.—Choose porous plate on basis of nozzle size. Basic rule is to keep 5 to 1 pressure ratio or greater between prechamber and chamber and 2 to 1 or greater between manifold and prechamber.

TABLE 2

| Nozzle | | Grain | | | | | | |
|---|---|---|---|---|---|---|---|---|
| | | A | B | C | D | E | F | G |
| | | Grain diam. | | | | | | |
| No. | Diam. | .9995 | 1.498 | 1.699 | 1.999 | 2.503 | 3.000 | 3.500 |
| | | J = Area of nozzle throat/area of grain port | | | | | | |
| 1 | 0.1265 | .01601 | .00713 | .00554 | .00400 | .00255 | .00878 | .00013 |
| 2 | 0.2500 | .06256 | .02785 | .02165 | .01564 | .00998 | .06944 | .05102 |
| 3 | 0.3750 | .14076 | .06266 | .04871 | .35191 | .02244 | .01563 | .01147 |
| 4 | 0.4982 | .24845 | .11061 | .08599 | .06211 | .03961 | .02758 | .02026 |
| 5 | 0.6250 | .39102 | .17407 | .13532 | .09775 | .06235 | .04340 | .03188 |
| 6 | 0.9972 | .99540 | .44314 | .34449 | .24885 | .15827 | .11049 | .08117 |
| 7 | 1.149 | | .58832 | .45735 | .33038 | .21073 | .14669 | .10777 |
| 8 | 1.250 | | .69741 | .54216 | .39164 | .24980 | .17388 | .12776 |
| 9 | 1.375 | | .84250 | .65496 | .47313 | .30178 | .21006 | .15434 |

NOTE.—When a model is assembled, first give grain letter then nozzle number, i.e., G-5 would mean a grain port diameter of 3.5 inches and a nozzle throat of 0.625 inch was tested resulting in a motor J value of 0.032.

TABLE 3.—SAMPLE TEST RECORD

Geometry: 1-6 (i.e., nozzle No. 1, grain No. 6)

| Test Number | Geometry | Pressure | | | | $f_o$ | $\Delta f$ | $\alpha(\pi \Delta f)$ |
|---|---|---|---|---|---|---|---|---|
| | | Manifold | Prechamber | Chamber | Rotary valve | | | |
| 1 | G-5 | 250 | 120 | 25 | 500 | 540 | 20 | 63 |
| 2 | G-5 | 260 | 142 | 25 | 420 | 542 | 19 | 60 |

Various model configurations have been studied in the past including Titan 3C and Saturn IV B. In preparing models for testing the following procedures were observed.

1. The models to be tested were designed to mate with the NWC acoustic driver prechamber, the mating section of which is a 6-inch diameter, flat-face flange with a 1-inch face having 6 5/16-inch diameter by 3/4-inch long studs equally spaced on a 5 1/4-inch diameter bolt circle. The mating model was provided with a 1/2-inch thick flange, with mating clearance holes and a gasket seal. All joints were made pressure-tight for 20 p.s.i. service.
2. Each model chamber was fabricated with a heavy wall (not less than one-quarter inch thick) to eliminate losses through the wall. A chamber of 4 1/2-inches external diameter was found to be optimal. Motor length and internal diameter were scaled linearly. (most of the tests were run in a 3 1/2-inch ID by 1/2-inch thick aluminum chamber, using cylindrical slip inserts to vary the internal diameter to give port areas equivalent to zero, one-third, one-half, and full-burn times.) Internal star perforations did not need to be scaled and were typically replaced by cylindrical bores having the same port areas.
3. Nozzles were usually scaled by area to give the same ratio of grain-port to nozzle area throughout the entry section.

This requirement changes the angle of the nozzle entry section. Accuracies of 20 percent are considered satisfactory. Nozzle throat diameters used were in the range of one-quarter inch to 1 1/4-inches. Nozzle shapes after the sonic throat, it was discovered, do not affect losses and, thus nozzles were typically cut off sharply (roughly one-eighth inch) aft of the throat section.

4. Roughly, 10 to 15 tests of a simple model can be run in one day. However, tests series were usually planned to occupy approximately 1 week, consisting of 1 to 2 days of setup and 3 to 4 days of tests. A sample test record is given in table 3.

INSTRUMENTATION

Figure 4:
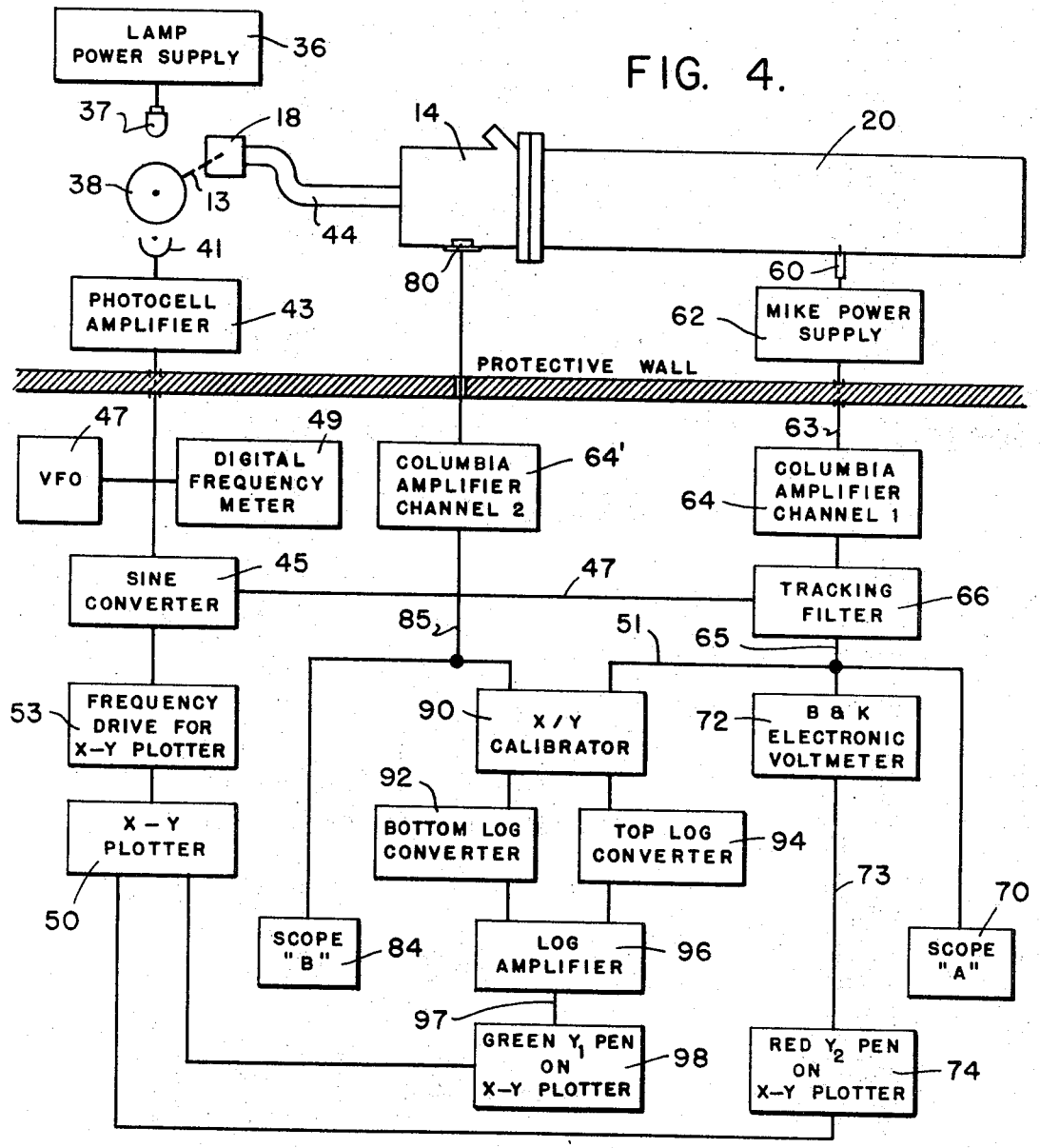
FIG. 4 is a detailed block diagram of the system of FIG. 1.

A block diagram of the instrumentation circuits used for the steady-state resonance tests with flow is shown in FIG. 4.

The system involves essentially three separate channels of data processing:

1. Frequency Conversion System. The X-axis of the X–Y plotter 50, which shows driving frequency, is driven by a DC signal proportional to the acoustic driving frequency. To do this, pips from the photodiode 41 are amplified by the photocell amplifier 43 and applied to the input of the sine converter 45. The output of the sine converter, a DC voltage proportional to the frequency, drives the X-axis of the X–Y plotter through frequency drive 53. On a separate output, the sine converter 45 also produces a sine wave of the same frequency as the incoming pips for use elsewhere in the system. A digital frequency meter 49 is used to obtain precise frequency measurements. A variable frequency oscillator 47 is used for calibration and will be discussed later.
2. Chamber Acoustic Pressure Data System. The microphone 60 is connected to its companion power supply 62, then to a Columbia amplifier 64. The amplified output is passed to a Spectral Dynamics tracking filter 66. A reference frequency signal 47 for the tracking filter 66 is supplied as an AC signal from the previously mentioned sine converter 45. The output 65 of the tracking filter 66 is fed to three instruments. a. Oscilloscope channel "A" 70 acts as a monitor of the acoustic chamber response 63. b. Electronic voltmeter-amplifier 72 rectifies the incoming signal 65 to give a DC output 73 which then goes to the red pen 74 of the X–Y plotter 50 to give a direct linear trace proportional to the model chamber response 63. c. The third branch from tracking filter 66 is taken through a circuit 51 to normalize the chamber response for changes in strength of the driving function 85 with frequency.
3. Prechamber Acoustic Pressure Data System. The relative driving power is measured by a Columbia microphone 80 mounted in the prechamber housing 14. Its signal is ampilfied by Channel #2 of a Columbia amplifier 64' and monitored at this point by oscilloscope channel B 84.

The normalization referred to above is done at this stage. The chamber response signal 63, mentioned above, is divided by the prechamber driving signal 85 from the prechamber microphone to obtain a final normalized chamber response curve. To do this, both signals are fed through an X–Y calibrator 90, the use of which will be discussed later, into individual log converters 92, 94. The use of log converters permits the signals to be, in effect, subtracted rather than divided. The log functions are subtracted in the log amplifier unit 96 and the output 97 used to drive the green $Y_1$ pen 98 of the X-Y plotter 50.

Figure 5:
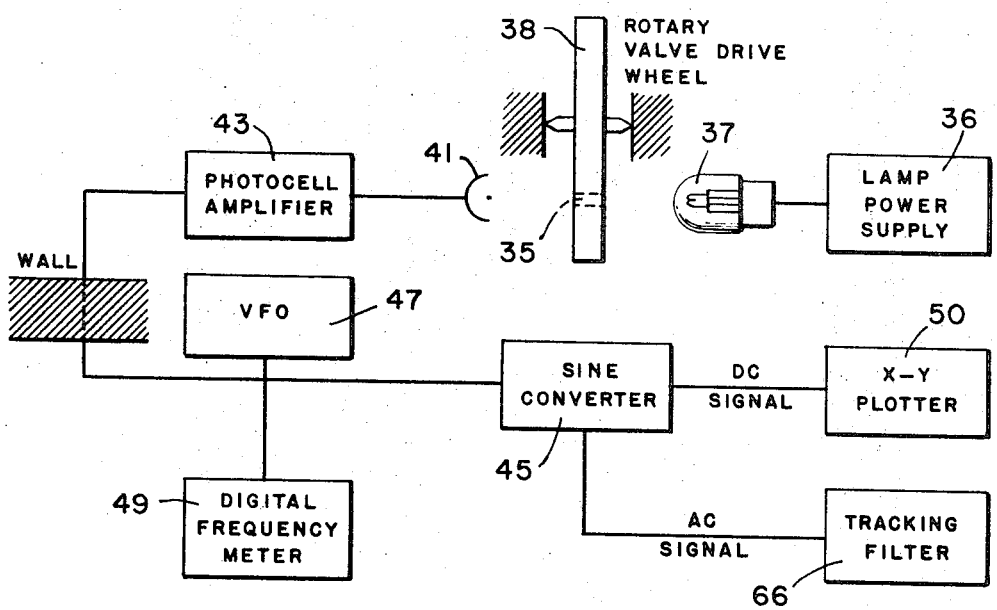
FIG. 5 is a detail view, partly in block diagram form, showing a portion of the system of FIG. 1.

FIG. 5 illustrates in more detail the function and operation of the drive wheel 38 which includes a translucent portion or opening 35 which allows light from lamp 37 to impinge on photocell 41 in timed relationship with the rotation of shaft 13. A power supply for lamp 37 is indicated at 36.

Before operation, the VFO 47 is used to set the pens 98 and 74 to produce a response curve within the confines of the X-Y plotter.

Once instrument settings have been made and individual circuits calibrated, the system is ready for use. Pressure of about 500 p.s.i. is supplied to the rotary valve (high J tests may have to go as high as 1500 p.s.i. on large models) and the pressure in chamber 32 regulated to about 25 p.s.i.

For best results the plotter amplifier gains should be adjusted to give as high amplitude curves as possible without overloading. The trace from the red pen gives the chamber response alone. The other, the green drive compensated (or normalized) logarithmic trace, gives the ratio of the chamber to the prechamber acoustic response. The alpha or temporal chamber damping constant is determined from each of these traces in the following manner.

Direct Chamber Response (Red Pen). The full amplitude of the red curve is measured from a zero line to the peak of the curve. This value is multiplied by 0.707 which gives the half-power amplitude. By counting the graph paper grid marks between the two points where the curve intersects the half-power amplitude line, the half-power bandwidth is determined. The half-power bandwidth is multiplied by 3.14 to obtain the value of alpha for the chamber tested.

Normalized Chamber Response (Green Pen). Using the green calibration lines between log 10/1 and log 1/1 ten equal increments are marked off. These increments are used to determine the log of 0.707 which is −0.151. The length of 0.151 is subtracted from the green pen trace at the resonance peak to determine the half-power amplitude. The bandwidth at this level is multiplied by 3.14 to arrive at the alpha value for the chamber tested.

PLOTTING OF DATA

The chamber damping constants obtained above are generally plotted against whatever variable was changed in the test. In some instances this is the J value of the motor and in some it is the total motor geometry or some particular geometry change.

Extensive plotting of the damping constant versus J data during extensive testing of a 1 foot chamber length model has resulted in the following expression for $\alpha$.

$$\alpha = \frac{cJ}{L}$$

Where "$\alpha$" is in seconds$^{-1}$, c is the speed of sound in feet per second, the motor length L is in feet, and J is the ratio of the nozzle throat area to the grain port area. Calibration checks of the over-all system performance may be made and matched to these data prior to running new or unfamiliar geometries.

NO FLOW ("FUZZY TUBE") SYSTEM

In the sonic flow method, considerable effort and expense is expended to obtain flow in the motor chamber housing tube and a sonic nozzle throat condition (critical flow) the latter being deemed more important since the greater loss of acoustic energy was determined to occur there and a radical difference was found to exist between the chamber losses depending on whether or not critical flow was achieved. A literature search revealed no data on acoustic losses from critical flow orifices or nozzles. However, from theory, it was reasoned that, with critical flow, the boundary condition at the throat was unique, since all acoustic pressure waves arriving at the Mach one point in the throat would pass on and, regardless of what happened downstream due to nozzle contour or other external factors, the supersonic flow in this region would prevent any possible coupling or back-influence with the chamber characteristics.

Without flow (or with a subsonic throat condition) on the other hand, events downstream of the nonsonic throat could propagate back into the chamber. The sonic throat condition was, therefore, likened to no flow acoustic transmission into an infinitely long tube with perfect impedance matching to the nozzle throat condition. In such a tube, even without flow, sound waves would be transmitted from the chamber, through the nozzle, and into the tube. There would be no acoustic coupling back to the chamber because sound introduced at one end would keep going without reflection. If such a tube could be used, it would mean that the chamber acoustic testing technique described above would have far greater applicability; virtually all of the expensive test gear could be done away with; models or actual motors with hot propellant grains in place could be tested; the severe throat size limits which dictate the air flow requirements could be done away with; and much sharper data could be obtained in the absence of air flow noise.

However, it is not possible to have, for our experiments, a tube of infinite length. But a long piece of tubing with an acoustically absorbing material, such as fur, glued around the inside wall so as to slowly attenuate the waves being transmitted into it (see FIG. 6) acts in much the same way as an infinite tube.

Figure 6:
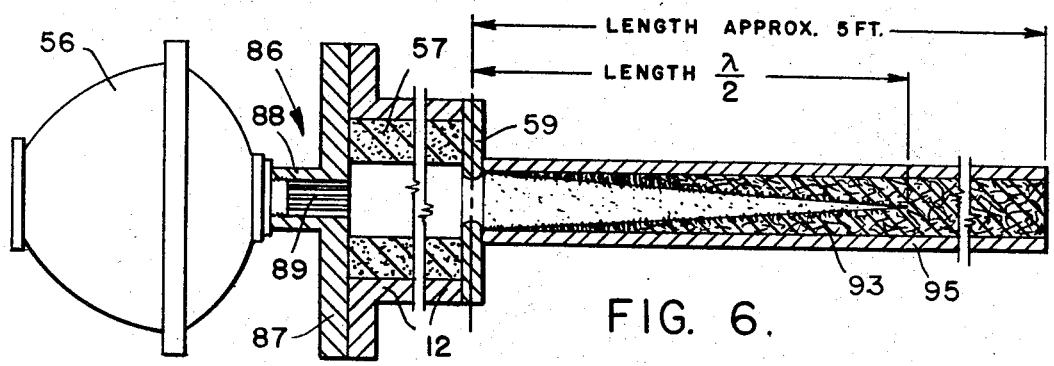
FIG. 6 is a detail view, partly in cross section, of a no-flow modification of the basic invention.

No flow experiments, referred to as the "fuzzy tube experiments", were run using the apparatus shown in FIG. 6. This apparatus comprises a five-foot length of pipe 95 used to achieve an anechoic throat condition. Pipe 95, which should be the same inside diameter as the nozzle throat piece to be tested, is stuffed loosely with a material 93 such as fiberglass, or the like which is tapered so as to eventually fill the pipe completely at a point one-half wavelength from the nozzle. This pipe may be either screwed directly into the nozzle end piece 59 or tightly bolted into place to prevent impedance mismatch between nozzle throat 58 and pipe 95. A University type ID-60 loud speaker driver 56 is coupled to the cavity 32 with a ⅝-inch diameter tube 88 stuffed tightly with .051-inch diameter brass rods 89 to decouple the loudspeaker driver 56 from the model cavity 32 at resonance.

Figure 7:
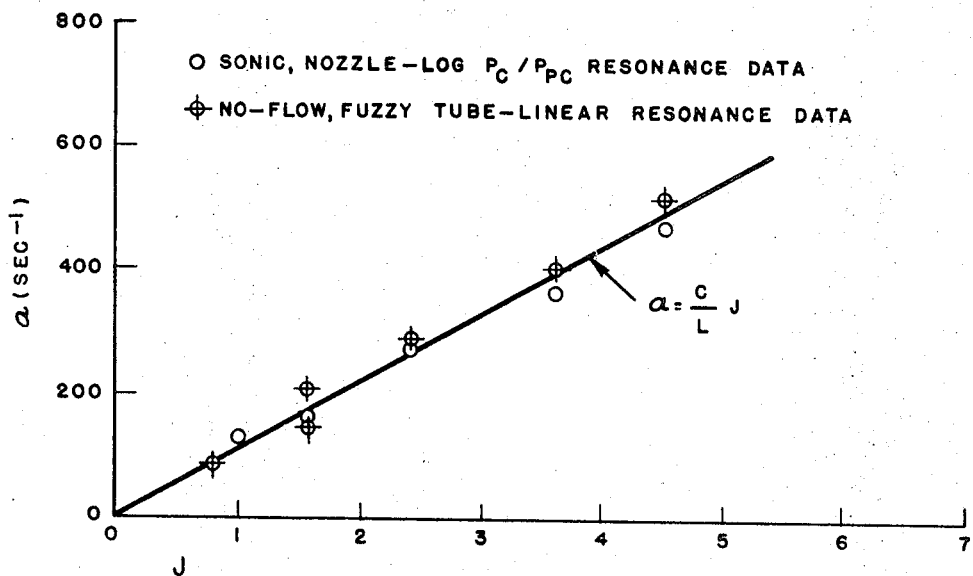
FIG. 7 is a plot of test results obtained with the present invention.

Test results are shown in FIG. 7. No-flow and sonic-flow tests both show good agreement over the J-range tested.

Figure 8:
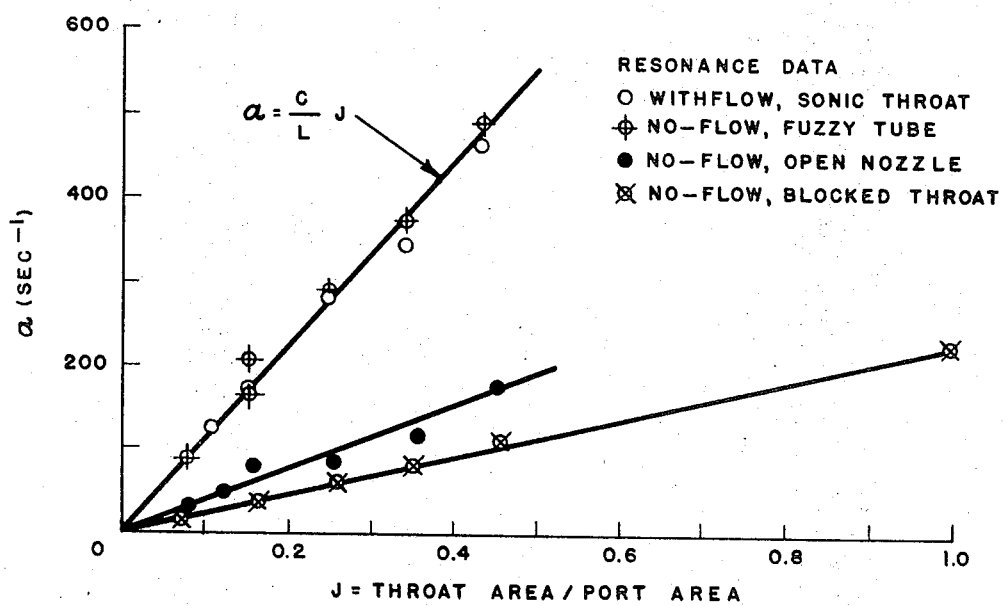
FIG. 8 is a plot of test results obtained by several different methods.

As a further check on the "fuzzy tube" method, a series of tests were made with different nozzle throat boundary conditions. These included: 1. flow tests with a sonic nozzle throat (described above using the cold air test apparatus and facility), 2. no-flow tests using the fuzzy tube apparatus (described here), 3. no-flow tests with the nozzle throat merely left open (atypical test described in the literature), and 4. no-flow tests with the nozzle blocked or "plugged" at the throat (another typical test procedure found in the literature). A comparison of these results is made in FIG. 8 and shows the extraordinary range of results recorded. Open throat and blocked throat no-flow tests show poor agreement with the sonic throat data. Replotted to this scale, the data graphically emphasize the ability of an anechoic throat arrangement, such as disclosed in FIG. 6, to simulate the costly and difficult sonic-flow tests for investigating radiative acoustic losses.

It is claimed:
1. The method of determining the acoustic properties of full scale rocket engines to predict the geometrically related acoustic gain and loss mechanisms comprising:
   a. providing a scale model rocket engine having a chamber geometry proportional to a full scale engine;
   b. acoustically driving said chamber;
   c. recording the acoustical response of said chamber to provide a response curve;
   d. computing the chamber temporal acoustic attenuation coefficient based on the half power bandwidth of the response curve;
   e. wherein the chamber is acoustically driven by a high input impedance air flow to provide a sonic nozzle throat condition.

2. The method of claim 1 wherein the chamber is acoustically driven by a decoupled acoustic driver with no mass air flow.

3. The method of claim 2 wherein the acoustic driver is attached to one end of the chamber and an anechoic chamber is communicatively attached to the other end of the chamber.

4. Means for investigating the acoustic properties of combustion chambers comprising:
a hollow elongated model housing;
acoustic driver adaptor means attached to one end of said housing;
the other end of said housing having nozzle attaching means;
acoustic driver means attached to said adaptor means opposite said housing;
means, including said nozzle attaching means, for changing the geometry of said housing to provide a simulated combustion chamber ratio between the cross-sectional area of said chamber with respect to the area of the nozzle throat; and
means communicating with said chamber for detecting and recording the acoustic response of said chamber when said chamber is driven by said acoustic driver; and
wherein said acoustic driver means include means for producing a high input impedance air flow to provide a sonic nozzle throat condition.

5. Apparatus according to claim 4 wherein said adaptor comprises an acoustically isolated prechamber.

6. Apparatus according to claim 4 wherein said acoustic driver is effectively decoupled from said chamber and an anechoic chamber is communicatively attached to the opposite end of said chamber.

7. Apparatus according to claim 6 wherein said anechoic chamber comprises an elongated housing having inner wall surfaces lined with fur or the like.

8. Apparatus according to claim 7 wherein the fur or the like lining said inner wall surfaces has an increasingly longer fur or nap outwardly from said simulated combustion chamber, until the anechoic chamber becomes completely filled with fur or nap at a point corresponding to one-half wavelength of the test frequency.